US012572661B2

(12) United States Patent
Patino et al.

(10) Patent No.: US 12,572,661 B2
(45) Date of Patent: Mar. 10, 2026

(54) UPDATE AGENT WITH PROVISIONING CONNECTIVITY AND SECURE ELEMENT COMPRISING THE SAME

(71) Applicant: GIESECKE+DEVRIENT MOBILE SECURITY GERMANY GMBH, Munich (DE)

(72) Inventors: David Patino, Sant Vicenc dels Horts (ES); Clara Gifre, Barcelona (ES); Federico Ruau, Hospitalet de Llobregat (ES)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 108 days.

(21) Appl. No.: 18/292,398

(22) PCT Filed: Jul. 26, 2022

(86) PCT No.: PCT/EP2022/025346
§ 371 (c)(1),
(2) Date: Jan. 26, 2024

(87) PCT Pub. No.: WO2023/006243
PCT Pub. Date: Feb. 2, 2023

(65) Prior Publication Data
US 2024/0346147 A1 Oct. 17, 2024

(30) Foreign Application Priority Data
Jul. 28, 2021 (EP) ..................................... 21382704

(51) Int. Cl.
*G06F 21/57* (2013.01)
*G06F 21/72* (2013.01)

(52) U.S. Cl.
CPC ............ *G06F 21/572* (2013.01); *G06F 21/72* (2013.01)

(58) Field of Classification Search
CPC ............................... G06F 21/572; G06F 21/72
See application file for complete search history.

(56) References Cited

U.S. PATENT DOCUMENTS

| | | | | |
|---|---|---|---|---|
| 9,436,455 | B2 * | 9/2016 | Ziat ........................ | H04W 12/35 |
| 10,069,633 | B2 * | 9/2018 | Gulati ................... | G06F 21/572 |
| 10,936,719 | B2 * | 3/2021 | Sibert ................ | H04W 12/086 |
| 2019/0065749 | A1 * | 2/2019 | Yang ..................... | G06F 21/572 |

OTHER PUBLICATIONS

Extended European Search Report from corresponding EP Application No. 21382704.1, Nov. 19, 2021.
International Search Report from corresponding PCT Application No. PCT/EP2022/025346, Oct. 18, 2022.

* cited by examiner

*Primary Examiner* — Harunur Rashid
(74) *Attorney, Agent, or Firm* — Workman Nydegger

(57) ABSTRACT

An update agent, a secure element containing the update agent, and a method for retrieving a software image to be stored onto the secure element includes a communication interface for providing connectivity to a storage module for downloading software images onto the SE. The update agent has a first memory storing authentication data for authenticating software images, and a second memory storing credentials for personalizing software images.

11 Claims, 7 Drawing Sheets

UPDATE AGENT WITH PROVISIONING CONNECTIVITY AND SECURE ELEMENT COMPRISING THE SAME

The present invention relates to secure elements in general and in particular to a secure element fitted with an update agent with provisioning connectivity and a method for providing provisioning connectivity to devices the secure element is embedded on.

BACKGROUND OF THE INVENTION

Smart cards are widely used in a variety of systems such as mobile phones, payment cards, access cards, to provide identification, authentication, data storage and application processing.

Where the smart card contains security-critical applications and sensitive data, such as in the case of payment cards and the like, a secure element is used to store the data. A secure element is a tamper resistant element, TRE, that provides a secure memory and execution environment in which application code and application data can be securely stored and administered. The secure element ensures that access to the data stored on the card is provided only when authorized.

Such a secure element may exist in any form factor such as UICC, embedded SE, smartSD, smart microSD, etc.

A secure element may include one or more security domains (SDs), each of which includes a collection of data, such as operating system, personalization data, packages, applets, applications, and the like, which are authenticated using security keys. Thus, the operating system and applications are stored within the secure element in volatile and non-volatile memory modules, and are executed in a secured processor of the secure element.

The specification Global Platform Card Technology Open Firmware Loader for Tamper Resistant Element v1.3 (in the following referred by [1]) describes a standardized mechanism for loading firmware (that is, use case dependent data which may contain the operating system and application data) into a secure element. In particular, an Open Firmware Loader, OFL, is provided inside the secure element, and configured to receive images of operation system and personalization data, to perform security checks-particularly authentication and integrity checks-on the images, and to trigger installation of the image contents into a memory of the secure element, so as to install in the secure element an operating system and personalization data.

For usage as an eSIM card, it is of utmost importance to keep identities safe and protected for unauthorized modifications. Some of these identities have specific certification requirements related to the environment where they can be loaded to a card. In particular, credentials comprising keys and certificates must be loaded in a controlled environment due to certain production-related restrictions, such as the need to have a certified environment to store keys from the GSMA or the adaptations required to personalize diversified data in factory.

FIG. 1 shows a schematic representation of the conventional production flow for loading firmware (e.g., an operating system, OS) into a secure element. The upper row shows the entities responsible for the corresponding production phase (I, II, III, IV), while the lower row shows the content of the secure element (i.e., chip). A chip manufacturer can provide, during a first production phase I, for a secure element to be loaded (usually in the chip factory) with trusted software, such as a secure operating system (OS)

130. The secure OS is personalized with credentials or personalization data, which are keys or certificates, and which are stored in a personalized OS image (in FIG. 1 identified by "maxiinit").

The personalized secure OS image 130 is loaded together with the OFL 110 inside the chip. The chip with its OS can then (phase II) be embedded in a portable card-like device or delivered to another device manufacturer to be included (phase III) in a bigger electronic device like a smart phone, a computer, a car, a measurement equipment, etc., and finally released to the market (phase IV).

In the conventional scenario as depicted in FIG. 1, the already installed OS has connectivity capabilities that allow it to communicate with a storage module or image delivery server to download an image of a new OS and to perform an update. In this way an OS installed and personalized during the first production phase can be later on updated with a new version.

Recent solutions for enabling secure download of OS images onto a tamper resistant element employ a stand-alone software loader (also referred to as an update agent or Image Trusted Loader, ITL), which is loaded onto the tamper resistant element during factory production, and which allows to perform updates of OS in the field, that is, outside the certified environment. Such an update agent could allow to load an OS onto a secure element at any time after the first production phase, provided that the trusted OS image itself is properly secured and the credentials including the keys and certificates have already been loaded in the certified environment during factory production.

With the stand-alone approach for an update agent/loader, there is thus a need for providing an update agent with provisioning capabilities for being able to efficiently retrieve and load an OS at any time during deployment of the secure element.

SUMMARY OF THE INVENTION

Through this application the expression "software" refers to any trusted software to be loaded and executed in the secure element. Examples include firmware, an operating system (OS), and any other use-case dependent secure applications. The expression "software image" (or "OS image") refers to a generic data format encapsulating a software version and crypto-graphic data to be used by the update agent.

According to a first aspect of the present invention, there is provided a secure element, SE, comprising an update agent. The update agent comprises a communication interface for providing connectivity to a storage module for downloading software images onto the SE. The update agent comprises further a first memory storing authentication data for authenticating software images, and a second memory storing credentials for personalizing software images.

According to a second aspect of the present invention, there is provided an update agent for updating software in a secure element. The update agent comprises a communication interface for providing connectivity to a storage module for downloading software images onto the secure element. The update agent comprises further a first memory storing authentication data for authenticating software images; and a second memory storing credentials for personalizing software images.

By equipping the update agent in the secure element with connectivity capabilities for establishing connection with a storage module, a flexible and independent way for loading software images onto the secure element is achieved, which does not depend on other connectivity capabilities of a host device, the secure element is embedded on.

The update agent is thus a stand-alone entity which is loaded in the factory onto the secure element, and which allows an operating system and/or other trusted software to be loaded on top of it at any time, even when the secure element, respectively a device the secure element is embedded on, is already deployed in the field. The update agent allows, through its provisioning connectivity means, to directly load an operating system in the field, that is, outside a certified environment.

The storage module can be a server, a database, a cloud node in a network system or any other entity capable of storing software images.

In some embodiments of the present invention according to the first or the second aspect, the communication interface is configured to provide connectivity through a mobile network and to implement network authentication algorithms.

Preferably, the communication interface is a wireless communication interface.

In some embodiments of the present invention according to the first or the second aspect, the update agent is configured to establish a direct connection with the storage module via the communication interface.

In some embodiments of the present invention according to the first or the second aspect, the update agent is configured to establish a connection with a Local Profile Assistant, LPA, of a device, the secure element is embedded on, via the communication interface, and to provide the LPA with connectivity to the storage module.

With other words, the update agent within the SE has limited, but functional, UICC capabilities (network authentication algorithms, and the minimal set of commands to effectively use them).

This allows a secure element without an UICC OS yet installed to provide the missing part to the mobile network modem in the device, thus enabling the device to download the UICC OS without requiring any other external aid or action from the user (i.e. WiFi or tethering to other devices).

In some embodiments of the present invention, the update agent is configured to establish a secure communication connection with the storage module through the communication interface, to retrieve a software image from the storage module; and to perform authentication of the software image using the authentication data stored in the first memory of the update agent.

Preferably, the secure element, particularly the update agent, authenticates the software image by verifying a digital signature, which may be associated with a vendor of the secure element or with a provider of an electronic device the secure element is embedded on. The digital signature may also be associated with an applet installed on the secure element. For instance, the update agent may use an encryption key associated with a particular vendor or device to verify the integrity of the software image.

In some embodiments of the present invention, the update agent is configured upon retrieving and authenticating the software image, to perform decryption of the software image. Preferably, decryption is performed using the authentication data stored in the first memory of the update agent.

The update agent may decrypt the software image using a second encryption key, which may be the same or different from the encryption key used for authentication. In one embodiment a public-private keys pair is used. Alternatively, a symmetric encryption method is used. The same encryption key may be used to sign, encrypt and/or decrypt the software image.

In some embodiments of the present invention, the update agent is configured to load the software image into a memory of the secure element.

In some embodiments of the present invention, the software image to be loaded in the SE is an operating system, OS.

Preferably, the OS is configured to retrieve the credentials or personalization data stored in the second memory of the update agent, and to perform personalization of the loaded OS image using the credentials. The obtained personalized OS image may be stored in the memory of the SE, preferably, by replacing the unpersonalized OS image. The OS may also be downloaded directly with the personalization or be personalized by another method.

According to a third aspect of the present invention, there is provided a method, performed by an update agent in a secure element, wherein the update agent comprises a communication interface, a first memory, and a second memory. The method comprises establishing a secure communication connection with a storage module through the communication interface; retrieving a software image from the storage module; and storing the personalized software image in a memory of the secure element.

Preferably, the method comprises further performing authentication of the software image using authentication data stored in the first memory, and/or performing personalization of the software image using the credentials stored in the second memory In some embodiments according to the third aspect, establishing a secure communication connection with the storage module comprises establishing via the communication interface a connection with a Local Profile Assistant, LPA, of a device, the secure element is embedded on, wherein the software image is retrieved from the storage module via the LPA.

It has to be noted that all the devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Reference will now be made to the accompanying figures, in which.

DETAILED DESCRIPTION

Figure 1:
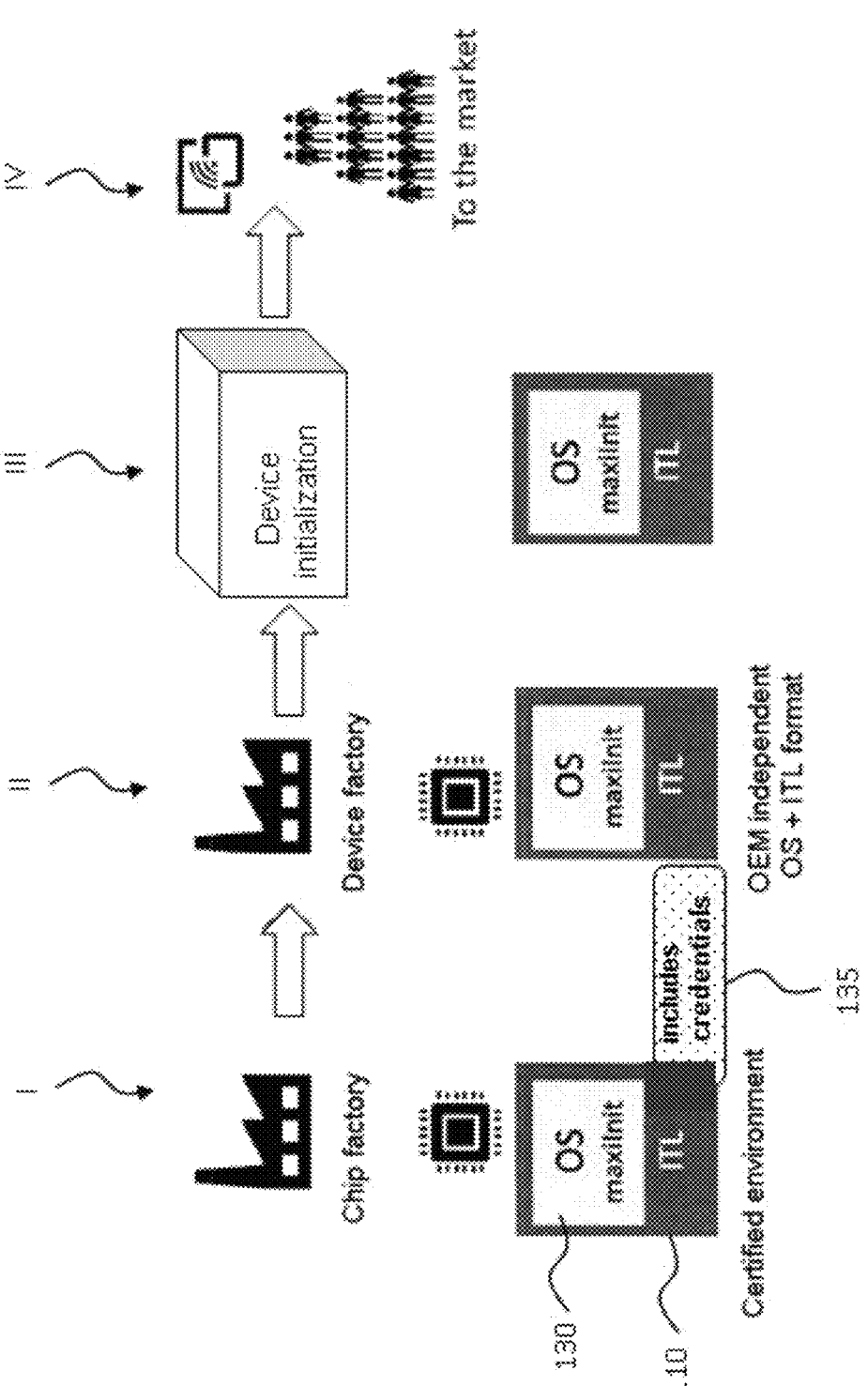
FIG. 1 shows a schematic representation of the conventional production flow of a secure element.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
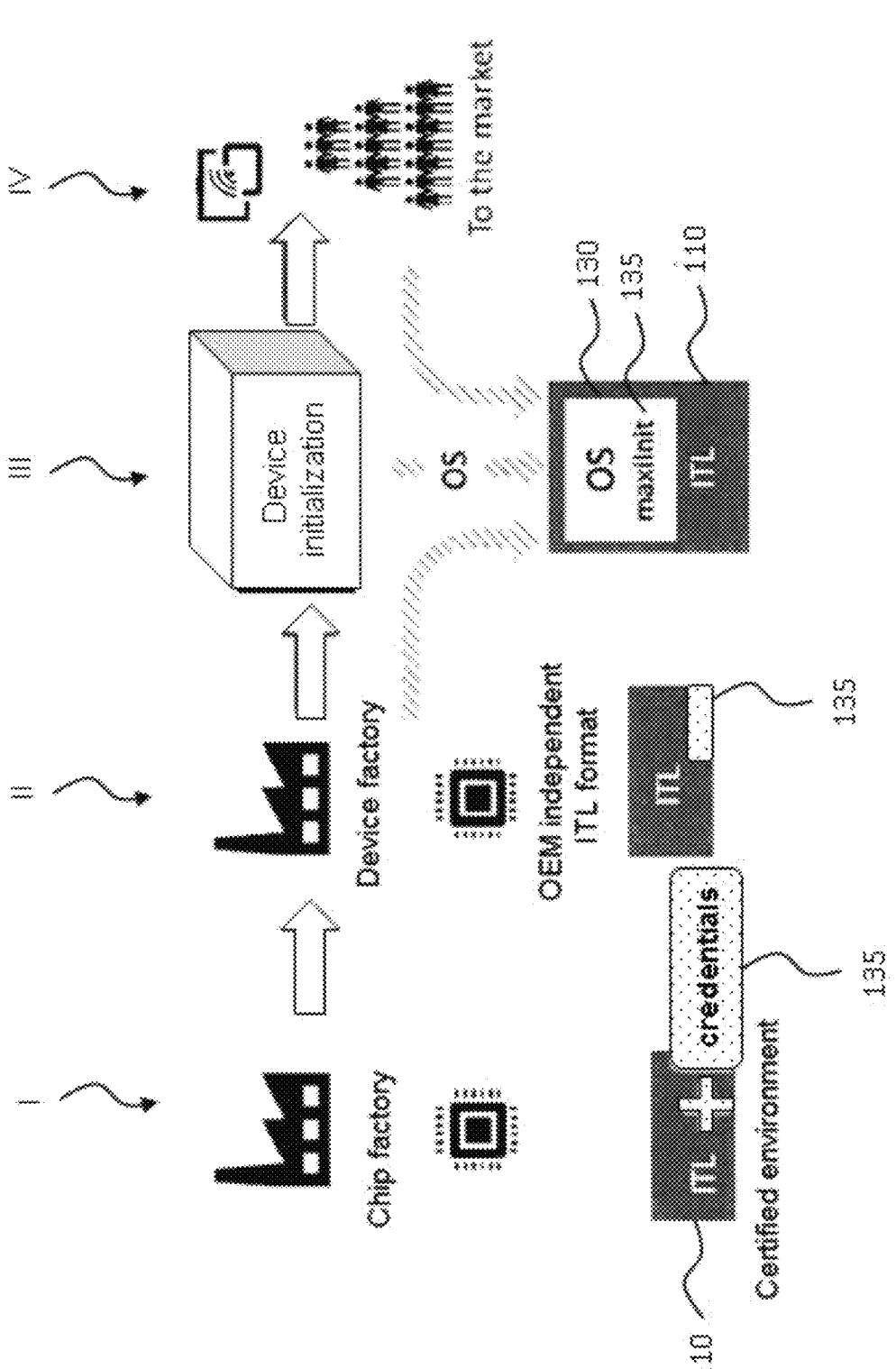
FIG. 2 shows a schematic representation of the production flow of a secure element according to an embodiment.

FIG. 2 shows a schematic representation of the production flow of a secure element comprising a stand-alone software loader or update agent according to an embodiment. The upper row in the figure shows the entities responsible for the corresponding production phases (I, II, III, IV), while the lower row shows the content of the secure element (i.e., chip) in each production phase.

The stand-alone update agent (i.e., Image Trusted Loader, ITL) is loaded onto the tamper resistant element during factory production phase I. That is, instead of loading the whole set at the chip factory (as in conventional production according to FIG. 1), only the ITL would be loaded at the first stage I of the process. The operating system OS could later on be loaded onto the SE 100 at any time even in the field, for instance when the chip is installed in a device (phase II), during device initialization (phase III) or when the device is used by a customer (phase IV).

Such a stand-alone update agent allows to load an OS onto a secure element at any time after the first production phase, provided that the trusted OS image itself is properly secured.

In order to retrieve the OS, a way to communicate with the update agent or software loader is needed. This could be done by setting a blackbox in a controlled environment or by using the connectivity provided by the device in which the tamper resistant element is located.

Any of these solutions, however, imply that an extra effort is required in order to retrieve the OS and load it into the TRE via the update agent/loader already loaded in the TRE.

To provide an efficient solution for loading an OS onto the SE after the SE production phase, the update agent according to the present invention is equipped with connectivity capabilities for connecting to an image delivery server to download the OS image at any time, whenever it is needed.

Figure 3:
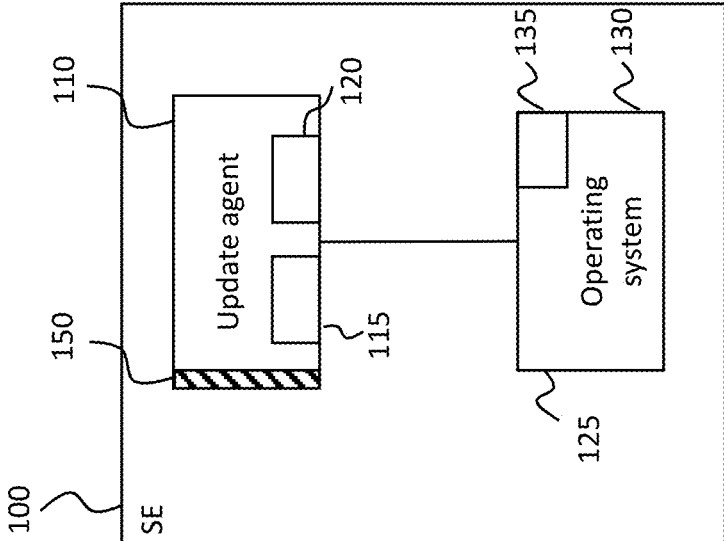
FIG. 3 shows the structure of a secure element according to an embodiment.

FIG. 3 shows the structure of a SE 100 containing a stand-alone update agent 110 according to an embodiment.

The SE 100 is a tamper resistant element, containing the update agent 110 and the OS 130. Both the update agent 110 and the OS 130 may be stored in a memory of the SE (not shown in FIG. 3). The OS and the update agent are independent entities that can communicate with each other, for instance over an Application Programming Interface, API 125.

The update agent 110 is a loader entity allowing the provisioning of software (such as, for instance, use case dependent firmware, operating system) within the SE. The update agent is the main entity in charge of loading software in the secure element, as well as any other procedure related to it (e.g., update, restore, rollback). The update agent 110 is loaded onto the SE 100 during factory production. The OS may be loaded onto the SE at a later time, after the SE has been installed in a host device.

The update agent 110 may contain two different memory structures or regions, to store sensible data thereon. A first memory structure 115 preferably contains authentication data, which is used by the update agent to authenticate and decrypt the software or OS image when loaded or updated at a later time. With other words, the first memory contains ITL data, that is, mainly the keys used to check authentication of the OS image to perform a load or an update and to decrypt them in order to be able to properly write the OS into the SE memory. Preferably, the first memory structure 115 comprises security keys or private credentials, for example, to gain access to change the firmware or to authenticate access for another application such as eSIM and other applications needed protected security keys. Only the update agent 110 has access to the memory region 115.

The second memory structure 120, which is accessible both by the update agent 110 and the operating system 130, may contain the personalization data of the OS, that is, the OS credentials 135. The credentials 135 comprise keys and certificates for personalizing OS images. With other words, the second memory stores OS data, that is, personalization data of the OS that could be lost in an update and needs to be kept. This way, if it is lost when performing an update, it can be retrieved and applied to the new OS. This will also contain the data for the first personalization of the OS for the ITL standalone use case.

Figure 4:
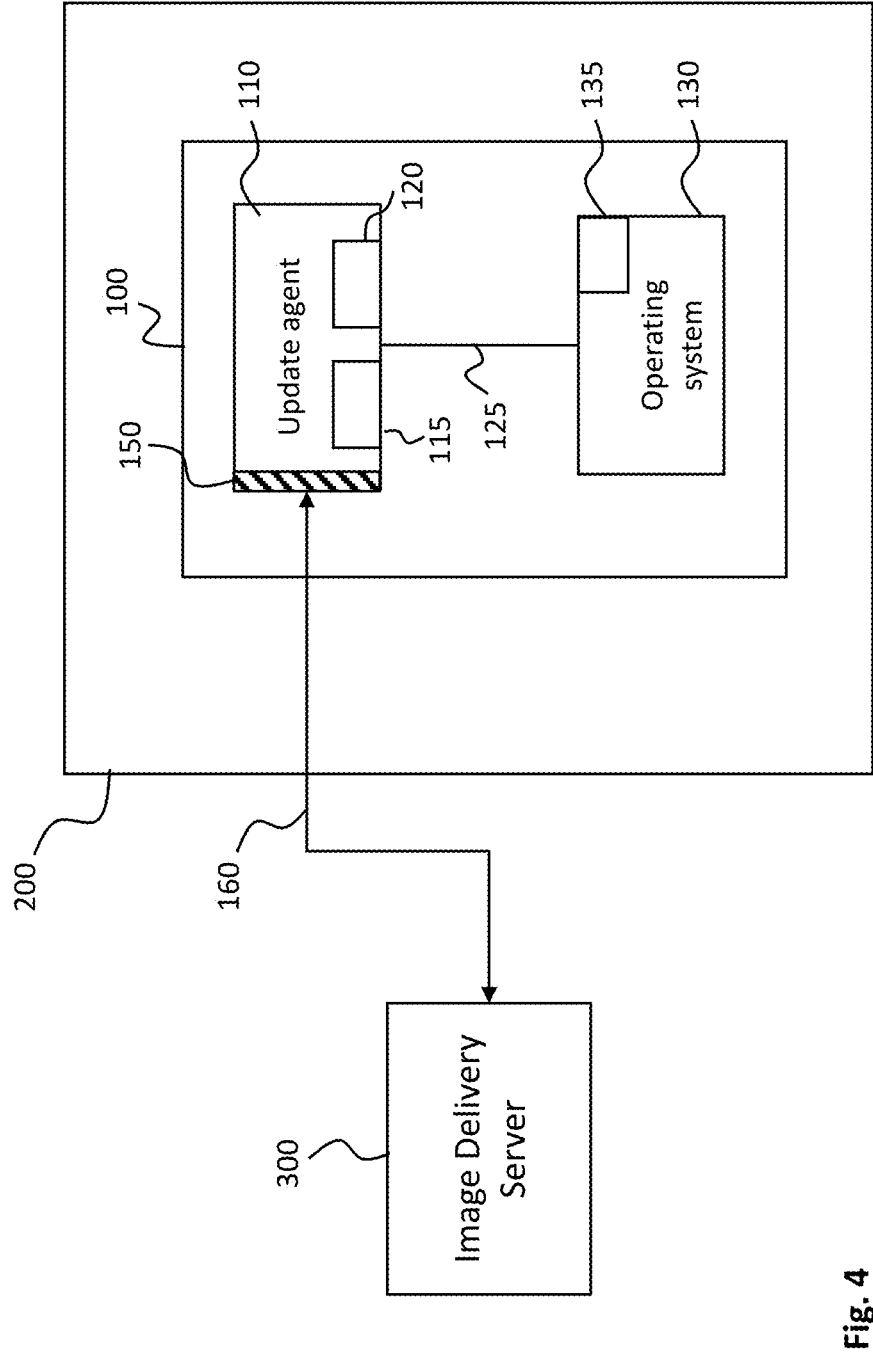
FIG. 4 shows the architecture of a system for implementing a method for retrieving software in a secure element according to an embodiment.

The update agent 110 is fitted with a communication interface 150, for providing connectivity to a storage module, such as the image delivery server 300, as depicted in FIG. 4, by means of which an OS can be retrieved and loaded onto the SE.

With reference to FIG. 4, the communication interface 150 may be realized as a wireless interface to allow the update agent 110 to establish a direct connection 160 with the storage module 300 for retrieving software and/or OS images stored thereon. Conventional wireless communication protocols, such as WiFi, Bloothoot, radio, NFC can be herein deployed.

Figure 5:
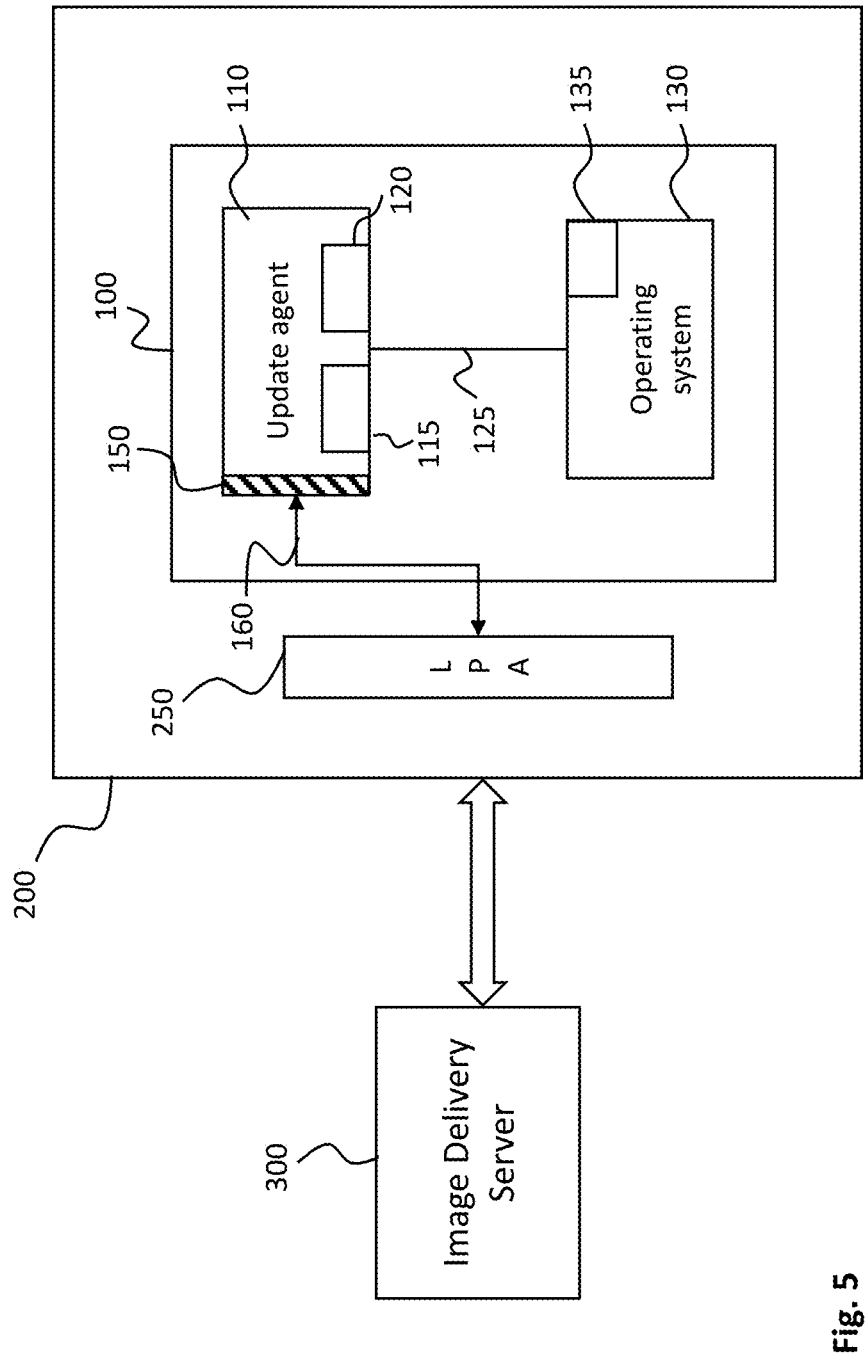
FIG. 5 shows the architecture of a system for implementing a method for retrieving software in a secure element according to another embodiment.

The update agent 110 may also establish a connection with a Local Profile Assistant, LPA, of a device 200, as depicted in FIG. 5.

The external device 200 may describe an entity which is in control and communicates with the SE 100. It can be a mobile terminal, or whatever device it is that the SE is mounted on. The device 200 may connect to the storage module or server 300, for instance via WiFi or similar protocols, download an OS image and sent it to the secure element through the connection 150 provided by the update agent. However, this solution requires a pre-existing connectivity in the device in order to retrieve the OS and load it into the TRE via the update agent/loader already loaded in the TRE.

Through the architecture depicted in FIG. 5, the update agent 110 may establish a connection 160 with the Local Profile Assistant LPA 250 of the device 200 via the communication interface 150, and thus provide the LPA with connectivity to the storage module 300. The update agent within the SE has limited, but functional, UICC capabilities (network authentication algorithms, and the minimal set of commands to effectively use them). This allows an SE without an UICC OS yet installed to provide the missing part to the mobile network modem in the device, thus enabling the device to download the UICC OS without requiring any other external aid or action from the user (i.e. WiFi or tethering to other devices).

Through the communication interface 150, the update agent 110 provides connectivity to a mobile network and allows to implement suitable network authentication algorithms based on credentials associated with the mobile network, which are stored in its second memory 120.

Figure 6:
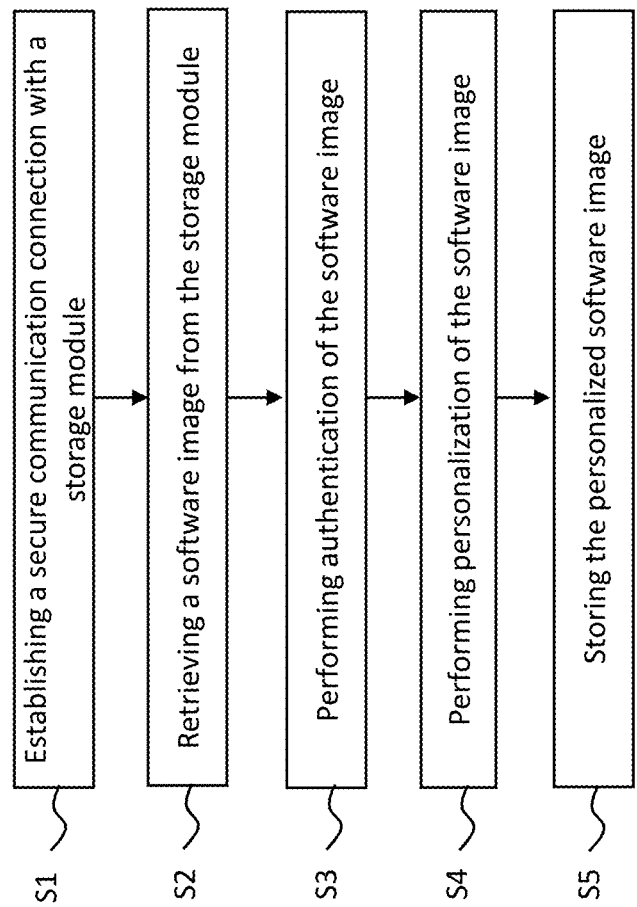
FIG. 6 shows a flow diagram illustrating a method implemented in a secure element according to an embodiment.
Figure 7:
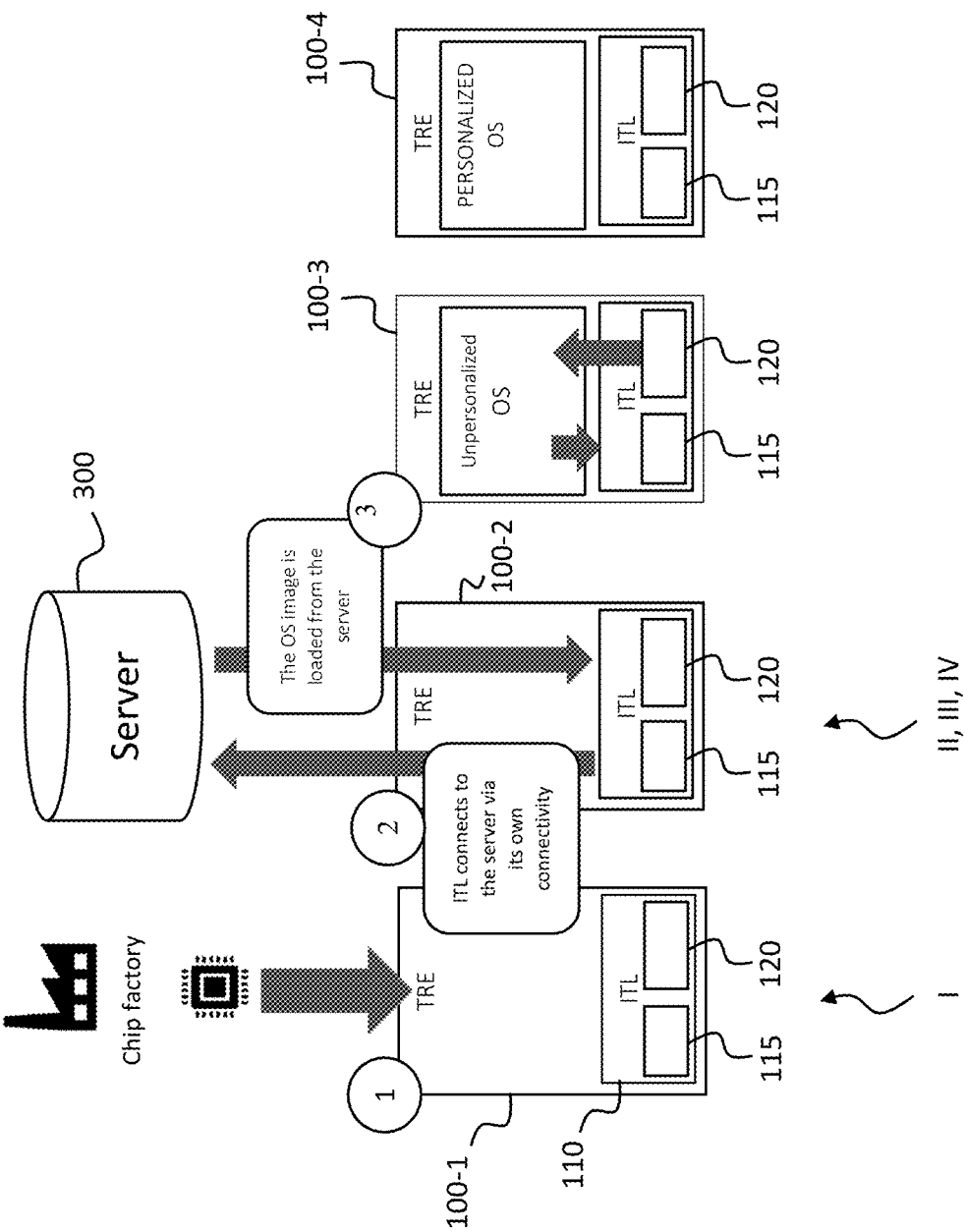
FIG. 7 shows a mapping of the steps of the method implemented in the secure element onto the production flow of FIG. 2 according to an embodiment.

FIG. 6 shows a flow diagram illustrating a method implemented in a secure element according to an embodiment. FIG. 7 shows a mapping of the steps of the method from FIG. 6 onto the production flow phases of FIG. 2 according to an embodiment.

The method is described in the following taking the OS as an example of software to be loaded and personalized. However, the method is not restricting to the OS software, and is applicable to any other software that can be executed on the secure element, such as, for instance firmware or an applet/application.

With reference to FIGS. 6 and 7, in a first step S1, the update agent 110 (ITL in FIG. 7), which has been loaded during phase I onto the SE/TRE 100, may establish a secure communication connection with a storage module or a server 300. Upon establishing the connection with the server 300, the update agent 110 may retrieve in step S2 an OS image from the server 300. Optionally, in step S3 the OS image may be authenticated using authentication data stored in the first memory 115 of the update agent 110. The retrieved OS image may be personalized in step S4 using the personalization data stored in the second memory 120 of the update agent 110. The personalized OS image is finally stored in a memory (not shown) of the SE 100.

All steps S1 to S5 can be performed outside of the certified environment available only during factory production phase I. The operations performed within the certified environment during factory production phase I include the loading of the update agent onto the SE.

The actual software (operating system) is downloaded, stored and personalized within the SE by the method illustrated in FIG. 6. The contents of the SE after each step of the claimed method are depicted in FIG. 7. In particular, before execution of step S2, the SE is in the state it was delivered from the factory, that is, with any operating system installed thereon. After step S2 (as well as after the optional step S3) the SE 100-3 contains an unpersonalized version of the OS. After step S4 is executed, the SE 100-4 contains the final personalized OS version (identified by OS maxiinit in FIG. 2), which contains the operating system plus its specific personalization/configuration, including credentials.

The methods and apparatus as described through the embodiments above, provides an efficient and secure solution for loading an operating system onto a secure element without the need of third parties, such as an extra step in the production line or the need of a preexisting connectivity in the device that contains the secure element. Through the secure communication interface provided by the update agent a flexible and efficient solution is provided for retrieving and loading software onto the secure element at any time during the lifecycle of the secure element. For instance, the solution allows for the actual OS to be loaded in the field, meaning that the OS-to-be-loaded could be decided later on after the production phase.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A secure element, SE, installed on a host device and comprising:

an update agent, wherein the update agent comprises:

a communication interface for providing connectivity to a storage module for downloading software images onto the SE;

a first memory storing authentication data for authenticating software images; and a second memory storing credentials for personalizing software images;

wherein the update agent is configured to establish a direct connection with the storage module via the communication interface;

wherein the communication interface operates independently of preexisting connectivity of the host device;

wherein the update agent is configured to download the software images outside of a certified environment and after factory production of the SE;

wherein the communication interface is configured to provide connectivity to the storage module through a mobile network and to implement network authentication algorithms, preferably using the credentials stored in the second memory of the update agent; and wherein the update agent is configured to establish a connection with a Local Profile Assistant, LPA, of the host device via the communication interface and to provide the LPA with connectivity to the storage module.

2. The secure element according to claim 1, wherein the update agent is configured to:

establish a secure communication connection with the storage module through the communication interface;

retrieve a software image from the storage module; and perform authentication of the software image using the authentication data stored in the first memory of the update agent.

3. The secure element according to claim 2, wherein the update agent is configured upon retrieving and authenticating the software image, to perform decryption of the software image using the authentication data stored in the first memory of the update agent.

4. The secure element according to claim 1, wherein the update agent is configured to load the software image into a memory of the SE.

5. The secure element according to claim 1, wherein the software image to be loaded in the SE is an operating system, OS, wherein the OS is configured to retrieve the credentials stored in the second memory of the update agent, and to perform personalization of the loaded OS image using the credentials, wherein the personalized OS image is stored in the memory of the SE.

6. An update agent for updating software in a secure element, SE, installed on a host device, the update agent comprising:

a communication interface for providing connectivity to a storage module for downloading software images onto the SE;

a first memory storing authentication data for authenticating software images; and a second memory storing credentials for personalizing software images;

wherein the update agent is configured to establish a direct connection with the storage module via the communication interface;

wherein the communication interface operates independently of preexisting connectivity of the host device;

wherein the update agent is configured to download the software images outside of a certified environment and after factory production of the SE;

wherein the communication interface is configured to provide connectivity to the storage module through a mobile network and to implement network authentication algorithms, preferably using the credentials stored in the second memory of the update agent; and wherein the update agent is configured to establish a connection with a Local Profile Assistant, LPA, of the host device via the communication interface and to provide the LPA with connectivity to the storage module.

7. The update agent according to claim 6, wherein the update agent is configured to establish a connection with a Local Profile Assistant, LPA, of the host device via the communication interface and to provide the LPA with connectivity to the storage module.

8. The update agent according to claim 6, wherein the communication interface is configured to provide connectivity through a mobile network and to implement network authentication algorithms.

9. A method, performed by an update agent in a secure element, SE, the SE being installed on a host device, wherein the update agent comprises a communication interface, a first memory, and a second memory, the method comprising:

establishing a secure communication connection directly with a storage module through the communication interface;

retrieving a software image from the storage module;

performing personalization of the software image using credentials stored in the second memory; and storing the personalized software image in a memory of the SE;

wherein the communication interface operates independently of preexisting connectivity of the host device;

wherein the update agent is configured to retrieve the software images outside of a certified environment and after factory production of the SE;

wherein the communication interface is configured to provide connectivity to the storage module through a mobile network and to implement network authentication algorithms, preferably using the credentials stored in the second memory of the update agent; and wherein the update agent is configured to establish a connection with a Local Profile Assistant, LPA, of the host device via the communication interface and to provide the LPA with connectivity to the storage module.

10. The method according to claim 9, further comprising:

performing authentication of the software image using authentication data stored in the first memory.

11. The method according to claim 9, wherein establishing a secure communication connection with the storage module comprises establishing via the communication interface a connection with a Local Profile Assistant, LPA, of the host device, wherein the software image is retrieved from the storage module via the LPA.

* * * * *